(12) United States Patent
Wang et al.

(10) Patent No.: US 8,737,725 B2
(45) Date of Patent: May 27, 2014

(54) METHOD AND SYSTEM FOR LEARNING BASED OBJECT DETECTION IN MEDICAL IMAGES

(75) Inventors: Peng Wang, Princeton, NJ (US); Terrence Chen, Princeton, NJ (US); Shaohua Kevin Zhou, Plainsboro, NJ (US); Dorin Comaniciu, Princeton Junction, NJ (US); Martin Ostermeier, Buckenhof (DE)

(73) Assignee: Siemens Aktiengesellschaft (DE)

( * ) Notice: Subject to any disclaimer, the term of this patent is extended or adjusted under 35 U.S.C. 154(b) by 277 days.

(21) Appl. No.: 13/235,747

(22) Filed: Sep. 19, 2011

(65) Prior Publication Data

US 2012/0093397 A1    Apr. 19, 2012

Related U.S. Application Data

(60) Provisional application No. 61/384,394, filed on Sep. 20, 2010.

(51) Int. Cl.
*G06K 9/62*    (2006.01)

(52) U.S. Cl.
USPC .......................................... 382/159

(58) Field of Classification Search
None
See application file for complete search history.

(56) References Cited

U.S. PATENT DOCUMENTS

| | | |
|---|---|---|
| 2007/0286477 A1 | 12/2007 | Kim et al. |
| 2008/0089560 A1* | 4/2008 | Li et al. .................. 382/118 |
| 2009/0062641 A1* | 3/2009 | Barbu et al. ................ 600/424 |
| 2010/0040272 A1 | 2/2010 | Zheng et al. |
| 2010/0101676 A1 | 4/2010 | Quigley et al. |
| 2010/0142787 A1 | 6/2010 | Zheng et al. |
| 2010/0166266 A1 | 7/2010 | Jones et al. |

OTHER PUBLICATIONS

Rainer Lienhart, et al., "Empirical Analysis of Detection Cascades of Boosted Classifiers for Rapid Object Detection",DAGM'03, 25th Pattern Recognition Symposium, Sep. 2003.*

* cited by examiner

*Primary Examiner* — Atiba O Fitzpatrick
*Assistant Examiner* — Thomas A James

(57) ABSTRACT

Methods and Systems for training a learning based classifier and object detection in medical images is disclosed. In order to train a learning based classifier, positive training samples and negative training samples are generated based on annotated training images. Features for the positive training samples and the negative training samples are extracted. The features include an extended Haar feature set including tip features and corner features. A discriminative classifier is trained based on the extracted features.

33 Claims, 6 Drawing Sheets

METHOD AND SYSTEM FOR LEARNING BASED OBJECT DETECTION IN MEDICAL IMAGES

This application claims the benefit of U.S. Provisional Application No. 61/384,394, filed Sep. 20, 2010, the disclosure of which is herein incorporated by reference.

BACKGROUND OF THE INVENTION

The present invention relates to learning based object detection in medical images, and more particularly, to learning based object detection using a set of features designed to effectively detect medical devices in fluoroscopic images.

In image guided interventions, clinicians use medical devices that are inserted into patients' blood vessels to perform various operations. Various types of medical devices are used in image guide interventions, including catheters, guidewires, and stents. Such medical devices are typically visible in the fluoroscopic images during surgery and typically subject to both breathing motion and cardiac motions. Often, the visibility of medical devices in the fluoroscopic images if affected by the radiation dose, image artifacts, and occlusion by anatomic structures. It is a challenging but important task to automatically and robustly detect and track medical devices in fluoroscopic images, in order to provide quantitative information regarding the position and motion of such devices and to assist in computer aided interventional procedures.

BRIEF SUMMARY OF THE INVENTION

The present invention provides a methods and systems for training a learning based object detector and detecting an object in a medical image. Object detection is a two-class classification problem, which is to classify an object in a medical image from non-object portions of the image (i.e., background). In various embodiments of the present invention, the object being detected may be a medical device, such as a catheter, guidewire, etc. Two important components for object detection in medical images are the features and the classifier. The features are a vector of values that represent the characteristics of a type of object and are used to distinguish the object from the non-object. The classifier takes the feature values as inputs and outputs a candidate class label for an object candidate in a medical image. Medical device detection in fluoroscopic images is challenging due the appearance variation and low visibility of medical devices in fluoroscopic images. Embodiments of the present invention provide features and classifier structures designed to improve the accuracy and efficiency of detection and tracking of medical devices.

In one embodiment of the present invention, a plurality of positive training samples and a plurality of negative training samples are generated based on annotated training images. A plurality of features are extracted for each of the positive training samples and the negative training samples, and the plurality of features includes an extended Haar feature set including at least one of a tip feature and a corner feature. A discriminative classifier is trained based on the features extracted for the positive training samples and the negative training samples.

These and other advantages of the invention will be apparent to those of ordinary skill in the art by reference to the following detailed description and the accompanying drawings.

DETAILED DESCRIPTION

Figure 1:
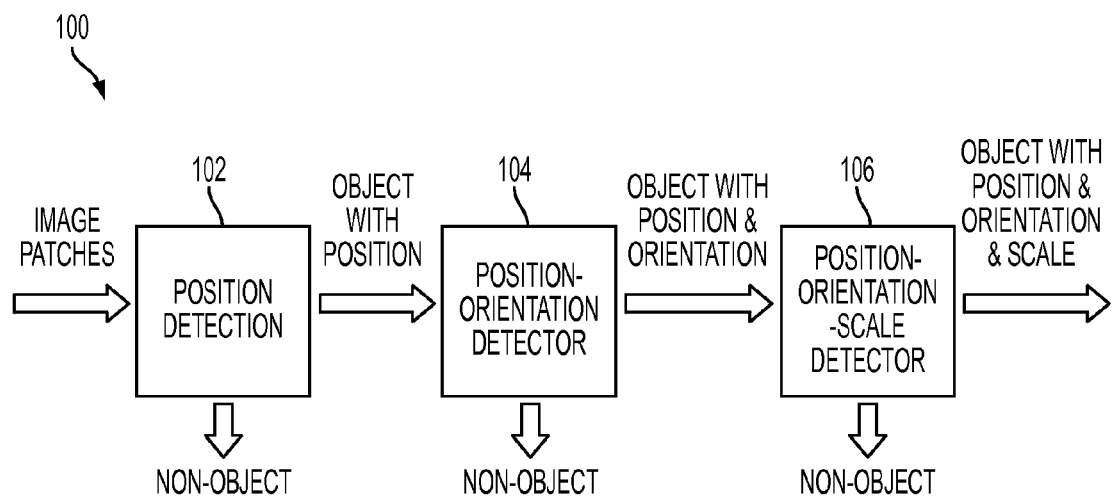
FIG. 1 illustrates a structure of an MSL-based 2D object detector according to an embodiment of the present invention.

The present invention is directed to a methods and systems for training a learning based object detector and detection of an object in a medical image. Embodiments of the present invention are described herein to give a visual understanding of the left ventricle detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Discriminative learning based object detection is a two-class classification problem, which is to classify an object (e.g., a medical device, such as a catheter, guidewire, etc.) in a medical image from non-object portions of the image (i.e., background). Two important components for object detection in medical images are the features and the classifier. The features are a vector of values that represent the characteristics of a type of object and are used to distinguish the object from the non-object. The classifier takes the feature values as inputs and outputs a candidate class label for an object candidate in a medical image.

Medical device detection in fluoroscopic images is challenging due the appearance variation and low visibility of medical devices in fluoroscopic images. Embodiments of the present invention provide features and classifier structures designed to improve the accuracy and efficiency of detection and tracking of medical devices. A generic framework for object detection is described herein that incrementally detects object states, from the position to the orientation to the scale. The object detection framework is a marginal space learning (MSL) based framework that can reduce training and learning difficulties at each state detection. Between different stages of object detection, embodiments of the present invention utilize a mechanism to carry state information from the previous stage to the next stage of detection. Embodiments of the present invention also introduce a set of 2D features that are designed to characterize medical devices. The features are an extension of traditional 2D Haar features, and have been demonstrated by the present inventors to be suitable for medical device detection tasks.

Marginal space learning (MSL) is a technique that has been developed to apply learning based techniques for 3D object detection and segmentation. For example, a method for MSL-based heart chamber segmentation is described in detail in U.S. Patent Application Publication No. 2008/0101676, entitled "System and Method for Segmenting Chambers of a Heart in a Three Dimensional Image", which is incorporated herein by reference. In order to efficiently detect an object using MSL, the object state (i.e., position, orientation, and scale) is estimated in a hierarchical and incremental manner in a series of marginal spaces with increasing dimensionality. That is, the object state set are marginally increased from one stage to the next stage of detection. At each stage, a new state is included in the detection and the object state is searched in the enlarged state space. By using MSL, the number of training samples required during training and the number of computations during detection are both significantly reduced. In practice, MSL has advantages in both computational efficiency and accuracy compared to direct training and detection of the joint state space. According to an embodiment of the present invention, the concept of MSL can be adapted for use in 2D object (e.g., medical device) detection.

FIG. 1 illustrates a structure of an MSL-based 2D object detector according to an embodiment of the present invention. As illustrated in FIG. 1, the object detector 100 includes three detection stages for position detection 102, position-orientation detection 104, and position-orientation-scale detection 106. Different from a traditional detector cascade, the MSL-based object detector 100 increases the object state from one stage to the next stage. For each stage 102, 104, and 106 in the hierarchical structure of object detector 100, a separate classifier is trained using annotated training data. In an advantageous implementation, the classifier for each stage 102, 104, and 106 can be trained using a Probabilistic Boosting Tree (PBT).

As illustrated in FIG. 1, image patches of an input image are input to the position detection stage 102 of the object detector 100. Each image patch is considered as an object candidate that is a box having a mean orientation and scale of the target object to be detected (determined based on the training data) and centered at a respective pixel of the input image. As object candidates are passes from one stage to the next stage, a new state of each object candidate is included. At the position detection stage 102, a trained position detection classifier is used to detect a probability that the position of each input image patch (object candidate) is a center position of the target object. Object candidates having positions with classification scores over a threshold are propagated to the position-orientation detection stage. Object candidates having positions with classification scores below the threshold are classified as non-object and not further processed.

At the position-orientation detection stage 104, each object candidate is sampled at a plurality of possible orientations at the corresponding position state by a trained position-orientation classifier and the orientation that corresponds to the maximum detected probability at each position is selected as the orientation for the correspond object candidate. Object candidates having position-orientation object states with classification scores over a threshold are propagated to the position-orientation-scale detection stage 106. Object candidates having position-orientation object states with classification scores below the threshold are classified as non-object and not further processed.

At the position-orientation-scale detection stage 106, each object candidate is sampled at a plurality of possible scales at the corresponding position and orientation states by a trained position-orientation-scale classifier. The scale that corresponds to the maximum detected probability is selected for each object candidate. Object candidates having position-orientation-scale object states with classification scores below a threshold are classified as non-object. In one possible implementation, the object candidate with the maximum detected classification score over the threshold is determined to be the complete object state (i.e., position, orientation, and scale) of the target object. In another possible embodiment, a certain number of object candidates having classification scores over the threshold can be clustered to generate the complete object state of the target object.

FIG. 1 illustrates an advantageous embodiment in the object states are search in the order of position, orientation scale. However, the order of searching the object states may be varied. For example, the object scale can be searched first, and then the orientation and position.

During the MSL-based object detection, a bootstrap strategy may be used at one or more of the detection stages 102, 104, and 106 to maximally explore the information in each search space. For each stage utilizing the bootstrap strategy, a second classifier is trained using false positives detected at that stage as negative training samples. The object candidates at that stage are then processed by two classifiers, the first for initial object state detection and the second to reduce false positives detected by the first classifier. During the bootstrap, there is no need to search in an additional state space, because the propagated candidates already carry state information.

Figure 2:
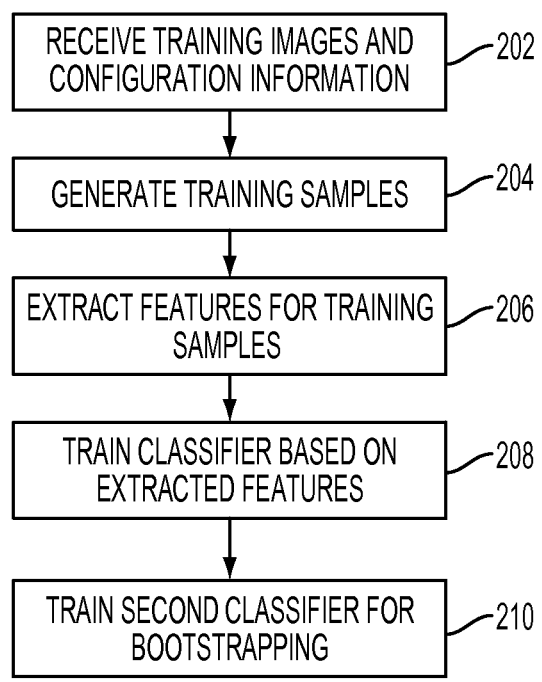
FIG. 2 illustrates a method for training a classifier according to an embodiment of the present invention.

FIG. 2 illustrates a method for training a classifier according to an embodiment of the present invention. The method of FIG. 2 can be used to train the classifiers for each stage of the 2D object detector of FIG. 1. As illustrated in FIG. 2, at step 202, a set of training images and configuration information is received. The training images are a set of images annotated with the location of a target object. Accordingly, the ground truth object state (position, orientation, and scale) is known for each training image. For example, the training images can be 2D fluoroscopic images and the target object can be a medical device (e.g., catheter, guidewire, stent, etc.) annotated in each 2D fluoroscopic image. The configuration information can include a training configuration that species the order of the detector hierarchy (e.g., position, orientation, scale) and the configuration for each stage. For example, the configuration for each stage can include information, such as a number of candidates to propagate, a threshold for object detection, steps sizes for orientation and scale sampling, and whether the bootstrap strategy should be used for a stage.

Steps 204-210 are repeated for each stage of the object detector in order to train one or more classifier for each stage. At step 204, training samples are generated based on the training images. For the first stage of the MSL-based object detector, the positive samples are generated from the ground truth target object in the training images and the negative samples are generated randomly from the training images. For example, to train a classifier for position detection, pixels corresponding to ground truth center positions of the target object in the training images can be used as positive training samples, and randomly selected pixels farther than a certain distance away from the ground truth center positions can be used as negative training samples.

For stages other than the first stage, positive training samples are generated based on the ground truth target object in the training images. Negative training samples are generated using the object states that are propagated as false positives from the previous stage by setting new object states randomly for the object stated propagated from the previous stage. For example, to train a classifier for position-orientation detection, negative position-orientation samples are generated using positions detected as candidates by the trained position detector in the previous stage by randomly applying orientations that do not result in a position-orientation ground truth in the training images. Similarly, to train a classifier for position-orientation-scale detection, negative position-orientation-scale samples are generated using position-orientation candidates detected by the trained position-orientation detector in the previous stage by randomly applying scales that do not result in a ground truth position-orientation-scale in the training images.

At step 206, a set of features is extracted for each of the training samples. According to an advantageous embodiment of the present invention, the features include a set of extended Haar features designed by the present inventors for medical device detection. The extended set of Haar features can include Haar features for representing medical device tips (referred to herein as "tip features") and Haar features for representing corners (referred to herein as "corner features"). The set of features extracted for each training sample can also include two-dimensional features that simultaneously characterize image characteristics at two directions. The set of features can also include rotational features calculated by calculating the set of features while rotating an image or a portion of an image. The set of features in the set of features may also be scalable to characterize medical devices of various sizes.

Figure 3:
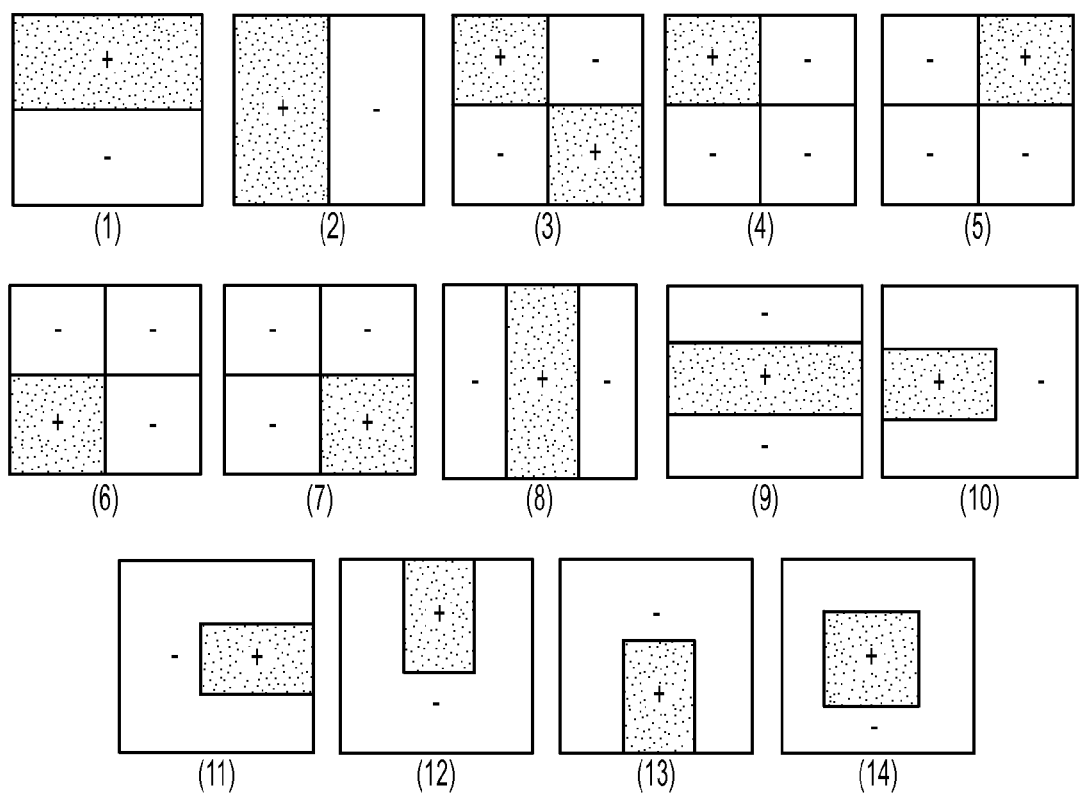
FIG. 3 illustrates an extended set of Haar features according to an embodiment of the present invention.

FIG. 3 illustrates an extended set of Haar features according to an embodiment of the present invention. A Haar feature considers adjacent rectangular regions at a specific location in an image, sums up the pixel intensities each rectangular region, and calculates differences between the pixel intensity sums adjacent rectangular regions. FIG. 3 illustrates an extended set of Haar features including features (1)-(14). For each of the Haar features (1)-(14), a feature value is calculated for a certain location in an image by adding the sum of pixel intensities in each shaded region containing a "+" and subtracting the sum of pixel intensities in each un-shaded region containing a "−". For example, when feature (1) one is placed at a pixel in an image, a feature value is calculated by subtracting the sum of pixel intensities in a rectangle below the pixel from the sum of pixel intensities in a rectangle above the pixel. According to an advantageous implementation, the image intensity is normalized by subtracting the mean intensity of the training images and dividing by the standard deviation, so that the image intensity stretching does not affect the feature values. The image intensity summations for calculating the feature values can be efficiently calculated with the use of integral images. The feature template size can be varied and automatically determined according to criteria used in the feature selection stage of the classifier training algorithm, resulting in a set of features of each feature (1)-(14) of FIG. 3.

The set of extended Haar features in FIG. 3 advantageously include tip features (10)-(13) which have been developed by the present inventors. The tip features (10)-(13) are effective at characterizing the tips of medical devices. A feature value for feature (10) is calculated at a pixel in the image by calculating the sum of pixel intensities in a rectangle to the left of the pixel that is centered vertically in the detection window and has a height that is smaller than that of the detection window, and the sum of pixel intensities in the remainder of the detection window (i.e., to the right of the pixel and above and below the positive rectangle). Feature values are calculated similarly for features (11), (12), and (13), with the positive rectangle being located to the right, above, and below the pixel, respectively.

The set of extended Haar features in FIG. 3 advantageously include coroner features (4)-(7) which have been developed by the present inventors. Each of the corner features (4)-(7) considers four adjacent squares centered at a pixel, and subtracts the sum of pixel intensities in three of the squares from the sum of pixel intensities in the remaining square.

The set of extended Haar features can also include various types of other features, as illustrated in FIG. 3, that may be designed for detection of lines, edges, or points in an image.

A medical device is a 2-dimensional structure, however features such as features (1), (2), (8), and (9) of FIG. 3 only characterizes the features in an image at one direction. Although the feature selection procedure used for training a classifier could sequentially select features at different directions, according to an advantageous embodiment of the present invention, the present inventors have designed two-directional features that simultaneously describe the characteristics of a medical device at two directions. In particular, the Haar features illustrated in FIG. 3 can be further extended to combine the features at two orthogonal directions (e.g., features (1) and (2), features (8) and (9)), in order to provide a better description of the device structure.

Assuming two features at orthogonal directions are denoted as $f_x$ and $f_y$, the two directional feature is defined as:

$$F = \arctan(f_y, f_x). \quad (1)$$

The two dimensional feature does not necessarily measure the object orientation or image gradient, although Equation (1) is similar to the computation of the image gradient. The feature essentially quantifies the relationship between the features at two orthogonal directions. For example, feature (9) of FIG. 3, with correct configuration, will provide minimum response to horizontal ridges and zero response to vertical ridges. However, without the constraints from another direction, this feature cannot distinguish among different structures.

Figure 4:
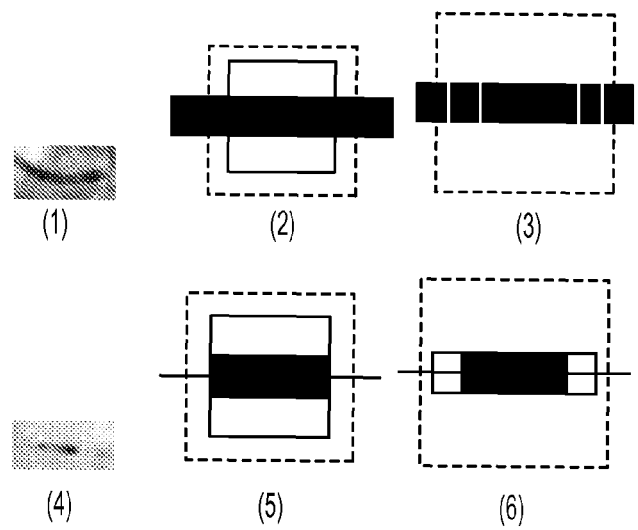
FIG. 4 illustrates an example of the discriminative capability of a two-directional feature.

FIG. 4 illustrates an example of the discriminative capability of a two-directional feature. As illustrated in FIG. 4, image (1) shows a guiding catheter body, image (2) shows a response of feature (8) of FIG. 3 applied to the guiding catheter body, image (3) shows a response to feature (9) of FIG. 3 applied to the guiding catheter body, image (4) shows an IVUS catheter, image (5) shows a response of feature (8) of FIG. 3 applied to the IVUS catheter, and image (6) shows a response to feature (9) of FIG. 3 applied to the IVUS catheter. As illustrated in images (2) and (5) of FIG. 4, feature (8) provides a similar response to both the IVUS catheter and the guiding catheter body. The two-directional features, if the configuration is set correctly can provide more discriminant capability, as shown in images (3) and (6). When combining features (8) and (9) at the orthogonal directions, the feature response for the guiding catheter body will be $\pi/2$ (with $f_x = 0$), and the response for the IVUS catheter will be $\pi/4$ (with $f_x = f_y$). Accordingly, the two-dimensional feature combines image characteristics at two directions, and provides an overcomplete feature set for feature selection.

Figure 5:
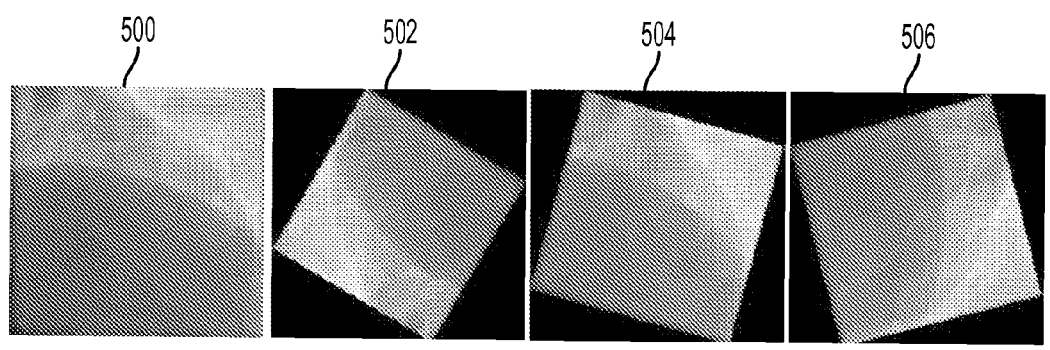
FIG. 5 illustrates image rotation.

The medical device insertion and the image acquisition during interventions can take place at different orientations. Accordingly, it is desirable that features be able to handle orientation variations. Haar like features have previously been extended to detect rotational objects. However, in an embodiment of the present invention additional features are extracted by rotating the images and then computing the features described above in the rotated images to generate features at the corresponding rotation angles. FIG. 5 illustrates image rotation. As illustrated in FIG. 5, image 500 is an exemplary fluoroscopic image and images 502, 504, and 506 show image 500 rotated at different angles. The rotated images 502, 504, and 506 of FIG. 5 are scaled to the same size for the purpose of visualization. Although image rotation may be considered time-consuming for real-time applications, image rotation has been significantly sped up with wide usage of multi-core CPUs in computers. Furthermore, since a region of interest (ROI) based operation is typically used in device tracking, only a partial region of an image may need to be rotated during detection, which further improves the speed of image rotation and the subsequent feature calculations.

Medical devices can appear at different sizes in fluoroscopic images. The actual size of the devices in the fluoroscopic images is affected by the effective image pixel size, the distance between a medical device and the imaging plane, and the imaging angle. To compensate for such size variations, the extended set of Haar features described above can be scaled with a scaling factor, resulting in multiple feature values at different scales for each feature. This may be implemented by scaling the corner coordinates when calculating the Haar features.

Returning to FIG. 2, at step 208, a classifier is trained for a detection stage of the object detector using the features extracted for the training samples. According to an advantageous embodiment, a probabilistic boosting tree (PBT) can be used to train the classifier based on the extracted features. In training a PBT, a tree is recursively constructed in which each tree node is a strong classifier. The input training samples are divided into two new sets, left and right ones, according to the learned classifier, each of which is then used to train the left and right sub-trees recursively. A feature selection algorithm is included in the training of the PBT that selects the optimal features to use to train the strong classifier at each node based on which feature provides can best discriminate between two classes (e.g., positive and negative) at a given node. This automatically selects which of extended set of Haar features to use and the order in which to use them based on the specific object being detected. Training a PBT classifier is described in detail in Tu et al., "Probabilistic Boosting-Tree: Learning Discriminative Models for Classification, Recognition, and Clustering," ICCV, 1589-1596 (2005), which is incorporated herein by reference.

At step 210, a second classifier is trained for the stage of the object detector based on the extracted features for reducing false positives detected by the classifier trained in step 208. The step can be optional for a given stage and depend on the configuration information received at step 202. In particular, in order to train the second training samples, ground truths from the training data are used as positive training samples and object states detected as positive by the classifier trained at step 208 that are actually negative are used as the negative training samples. The second classifier can be trained using a PBT based on the features extracted for the training samples. When the second classifier is trained for a stage of the object detector, two part detection using the classifiers trained at steps 208 and 210 is used during that stage of object detection.

As described above, steps 204-210 are repeated for each detection stage of the MSL-based object detector.

Figure 6:
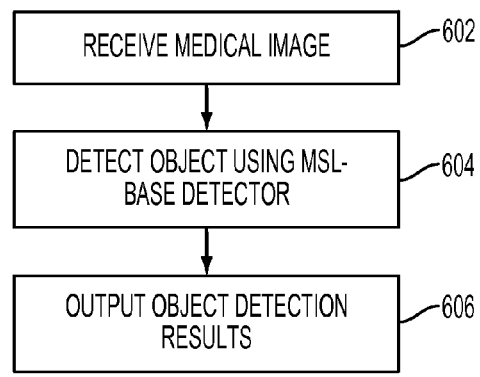
FIG. 6 illustrates a method for object detection according to an embodiment of the present invention.

FIG. 6 illustrates a method for object detection according to an embodiment of the present invention. The method of FIG. 6 may be used for detecting a medical device, such as a catheter, guidewire, stent, etc., in a 2D medical image. As illustrated in FIG. 6, at step 602, a medical image is received. For example, the medical image may be a 2D fluoroscopic image, which may be a frame of a sequence of fluoroscopic images. The medical image may be received directly from an image acquisition device, such as an x-ray device, or the medical image may be received by loading a previously acquired medical image from a memory or storage of a computer system.

At step 604, a target object is detected in the medical image using an MSL-based object detector based on features extracted from the medical image. The target object may be a medical device. The MSL-based object detector samples image patches of the medical image to detect a most likely object state (position, orientation, and scale) of the target object. The MSL-based object detector processes object candidates from the image data in detection stages described above in connection with FIG. 1. Each detection stage utilizes a trained classifier to extract features from object candidates and classify the object candidates based on extracted features. According to an advantageous embodiment, the features extracted for each object candidate can include the features described above in connection with step 206 of FIG. 2, including, but not limited to, the extended set of Haar features illustrated in FIG. 3, two-directional features calculated using orthogonal features of the extended set of Haar features, rotated features calculated by rotating the medical image or a portion of the medical image, and feature values corresponding to the extended set of Haar features calculated at multiple scales.

At step 606, the object detection results are output. For example, the object detection results may be displayed on a display device of a computer system or stored in a memory or storage of a computer system.

Figure 7:
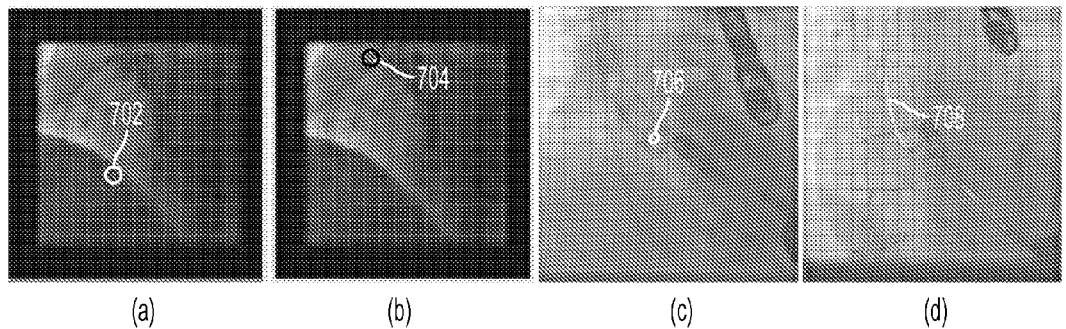
FIG. 7 illustrates exemplary detection results for different medical device detection and tracking tasks.

FIG. 7 illustrates exemplary detection results for the detector and features described above applied to different medical device detection and tracking tasks. Image (a) of FIG. 7 shows detection results for an IVUS catheter 702 is a fluoroscopic image. Image (b) shows detection results for a catheter tip 704 in a fluoroscopic image. Image (c) shows detection results for a pigtail catheter 706 in a fluoroscopic image. Image (d) shows detection results for a catheter body 708 in a fluoroscopic image that connects with the pigtail catheter 706 of image (c).

Figure 8:
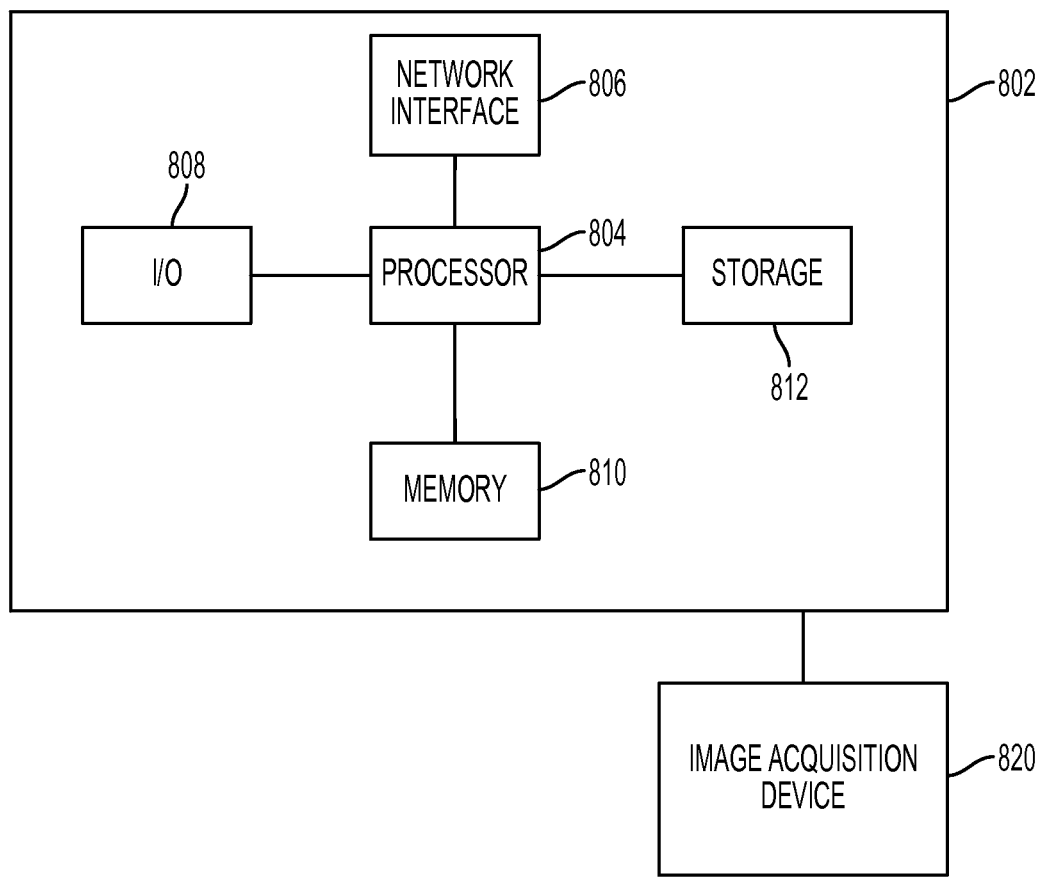
FIG. 8 is a high level block diagram of a computer capable of implementing the present invention.

The above-described methods for training a discriminative classifier and object detection in a medical image may be implemented on a computer using well-known computer processors, memory units, storage devices, computer software, and other components. A high level block diagram of such a computer is illustrated in FIG. 8. Computer 802 contains a processor 804 which controls the overall operation of the computer 802 by executing computer program instructions which define such operation. The computer program instructions may be stored in a storage device 812, or other computer readable medium (e.g., magnetic disk, CD ROM, etc.) and loaded into memory 810 when execution of the computer program instructions is desired. Thus, the detection stages of FIG. 1 and the method steps of FIGS. 2 and 6 may be defined by the computer program instructions stored in the memory 810 and/or storage 812 and controlled by the processor 804 executing the computer program instructions. An image acquisition device 820, such as an x-ray acquisition device, can be connected to the computer 802 to input MRI images to the computer 802. It is possible to implement the image acquisition device 820 and the computer 802 as one device. It is also possible that the image acquisition device 820 and the computer 802 communicate wirelessly through a network. The computer 802 also includes one or more network interfaces 806 for communicating with other devices via a network. The computer 802 also includes other input/output devices 808 that enable user interaction with the computer 802 (e.g., display, keyboard, mouse, speakers, buttons, etc.). One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for training a learning-based classifier comprising:
   generating a plurality of positive training samples and a plurality of negative training samples based on annotated training images;
   extracting a plurality of features for each of the positive training samples and the negative training samples, the plurality of features comprising an extended Haar feature set including at least one tip feature; and
   training a discriminative classifier based on the features extracted for the positive training samples and the negative training samples,
   wherein the step of extracting a plurality of features for each of the positive training samples and the negative training samples comprises:
   for each positive training sample and negative training sample, extracting the at least one tip feature by:
      calculating a sum of pixel intensities in a first rectangle positioned adjacent to the training sample in a first direction; and
      subtracting a sum of pixel intensities in a second rectangle positioned adjacent to the training sample in a second direction that is opposite the first direction and third and fourth rectangles that positioned on opposite sides of the first rectangle and adjacent to the second rectangle in the first direction from the sum of pixel intensities in the first rectangle.

2. A method for training a learning-based classifier comprising:
   generating a plurality of positive training samples and a plurality of negative training samples based on annotated training images;
   extracting a plurality of features for each of the positive training samples and the negative training samples, the plurality of features comprising an extended Haar feature set including at least one corner feature; and
   training a discriminative classifier based on the features extracted for the positive training samples and the negative training samples,
   wherein the step of extracting a plurality of features for each of the positive training samples and the negative training samples comprises:
   for each positive training sample and negative training sample, extracting the at least one corner feature by:
      subtracting a sum of pixel intensities in three squares positioned adjacent to the training sample from a sum of pixel intensities in a fourth square adjacent to the training sample.

3. The method of claim 1, wherein the extended Haar feature set includes four tip features to calculate feature values representing a medical device tip in four directions.

4. The method of claim 2, wherein the extended Haar feature set includes four corner features to calculate feature values representing a corner in four directions.

5. The method of claim 1, wherein the plurality of features further comprises a two-directional feature calculated by combining two features of the extended Haar feature set at orthogonal directions.

6. The method of claim 5, wherein the step of extracting a plurality of features for each of the positive training samples and the negative training samples comprises:
   for each positive training sample and negative training sample, calculating the two directional feature as $F=\arctan(f_y, f_x)$, where $f_x$ and $f_y$ are first and second features at orthogonal directions in the extended Haar feature set.

7. The method of claim 1, wherein the step of extracting a plurality of features for each of the positive training samples and the negative training samples comprises:
   rotating the training images to a plurality of angles; and
   extracting the plurality of features including the extended Haar feature set for each of the positive training samples and the negative training samples at from the training images at each of the plurality of angles.

8. The method of claim 1, wherein the step of extracting a plurality of features for each of the positive training samples and the negative training samples comprises:
   extracting feature values for each of the plurality of features including the extended Haar feature set at a plurality of scales for each of the positive training samples and the negative training samples.

9. An apparatus for training a learning-based classifier comprising:
   means for generating a plurality of positive training samples and a plurality of negative training samples based on annotated training images;
   means for extracting a plurality of features for each of the positive training samples and the negative training samples, the plurality of features comprising an extended Haar feature set including at least one tip feature; and
   means for training a discriminative classifier based on the features extracted for the positive training samples and the negative training samples,
   wherein the means for extracting a plurality of features for each of the positive training samples and the negative training samples comprises:
   means for extracting the at least one tip feature for each positive training sample and negative training sample, comprising:
      means for calculating a sum of pixel intensities in a first rectangle positioned adjacent to the training sample in a first direction; and
      means for subtracting a sum of pixel intensities in a second rectangle positioned adjacent to the training sample in a second direction that is opposite the first direction and third and fourth rectangles that positioned on opposite sides of the first rectangle and adjacent to the second rectangle in the first direction from the sum of pixel intensities in the first rectangle.

10. An apparatus for training a learning-based classifier comprising:
   means for generating a plurality of positive training samples and a plurality of negative training samples based on annotated training images;
   means for extracting a plurality of features for each of the positive training samples and the negative training samples, the plurality of features comprising an extended Haar feature set including at least one corner feature; and means for training a discriminative classifier based on the features extracted for the positive training samples and the negative training samples,
wherein the means for extracting a plurality of features for each of the positive training samples and the negative training samples comprises:
means for extracting the at least one corner feature for each positive training sample and negative training sample, comprising:
means for subtracting a sum of pixel intensities in three squares positioned adjacent to the training sample from a sum of pixel intensities in a fourth square adjacent to the training sample.

11. The apparatus of claim 9, wherein the extended Haar feature set includes four tip features to calculate feature values representing a medical device tip in four directions.

12. The apparatus of claim 10, wherein the extended Haar feature set includes four corner features to calculate feature values representing a corner in four directions.

13. The apparatus of claim 9, wherein the plurality of features further comprises a two-directional feature calculated by combining two features of the extended Haar feature set at orthogonal directions.

14. The apparatus of claim 13, wherein the means for extracting a plurality of features for each of the positive training samples and the negative training samples comprises:
means for calculating the two directional feature for each positive training sample and negative training sample as $F=\arctan(f_y, f_x)$, where $f_x$ and $f_y$ are first and second features at orthogonal directions in the extended Haar feature set.

15. The apparatus of claim 9, wherein the means for extracting a plurality of features for each of the positive training samples and the negative training samples comprises:
means for rotating the training images to a plurality of angles; and
means for extracting the plurality of features including the extended Haar feature set for each of the positive training samples and the negative training samples at from the training images at each of the plurality of angles.

16. The apparatus of claim 9, wherein the means for extracting a plurality of features for each of the positive training samples and the negative training samples comprises:
means for extracting feature values for each of the plurality of features including the extended Haar feature set at a plurality of scales for each of the positive training samples and the negative training samples.

17. A non-transitory computer readable medium encoded with computer executable instructions defining a method for training a learning-based classifier, the computer executable instructions defining steps comprising:
generating a plurality of positive training samples and a plurality of negative training samples based on annotated training images;
extracting a plurality of features for each of the positive training samples and the negative training samples, the plurality of features comprising an extended Haar feature set including at least one tip feature; and
training a discriminative classifier based on the features extracted for the positive training samples and the negative training samples,
wherein the computer executable instructions defining the step of extracting a plurality of features for each of the positive training samples and the negative training samples comprise computer executable instructions defining the step of:
for each positive training sample and negative training sample, extracting the at least one tip feature by:
calculating a sum of pixel intensities in a first rectangle positioned adjacent to the training sample in a first direction; and
subtracting a sum of pixel intensities in a second rectangle positioned adjacent to the training sample in a second direction that is opposite the first direction and third and fourth rectangles that positioned on opposite sides of the first rectangle and adjacent to the second rectangle in the first direction from the sum of pixel intensities in the first rectangle.

18. A non-transitory computer readable medium encoded with computer executable instructions defining a method for training a learning-based classifier, the computer executable instructions defining steps comprising:
generating a plurality of positive training samples and a plurality of negative training samples based on annotated training images;
extracting a plurality of features for each of the positive training samples and the negative training samples, the plurality of features comprising an extended Haar feature set including at least one corner feature; and
training a discriminative classifier based on the features extracted for the positive training samples and the negative training samples,
wherein the computer executable instructions defining the step of extracting a plurality of features for each of the positive training samples and the negative training samples comprise computer executable instructions defining the step of:
for each positive training sample and negative training sample, extracting the at least one corner feature by:
subtracting a sum of pixel intensities in three squares positioned adjacent to the training sample from a sum of pixel intensities in a fourth square adjacent to the training sample.

19. The non-transitory computer readable medium of claim 17, wherein the extended Haar feature set includes four tip features to calculate feature values representing a medical device tip in four directions.

20. The non-transitory computer readable medium of claim 18, wherein the extended Haar feature set includes four corner features to calculate feature values representing a corner in four directions.

21. The non-transitory computer readable medium of claim 17, wherein the plurality of features further comprises a two-directional feature calculated by combining two features of the extended Haar feature set at orthogonal directions.

22. The non-transitory computer readable medium of claim 21, wherein the computer executable instructions defining the step of extracting a plurality of features for each of the positive training samples and the negative training samples comprise computer executable instructions defining the step of:
for each positive training sample and negative training sample, calculating the two directional feature as $F=\arctan(f_y, f_x)$, where $f_x$ and $f_y$ are first and second features at orthogonal directions in the extended Haar feature set.

23. The non-transitory computer readable medium of claim 17, wherein the computer executable instructions defining the step of extracting a plurality of features for each of the positive training samples and the negative training samples comprise computer executable instructions defining the steps of:

rotating the training images to a plurality of angles; and
extracting the plurality of features including the extended Haar feature set for each of the positive training samples and the negative training samples at from the training images at each of the plurality of angles.

24. The non-transitory computer readable medium of claim 17, wherein the computer executable instructions defining the step of extracting a plurality of features for each of the positive training samples and the negative training samples comprise computer executable instructions defining the step of:
extracting feature values for each of the plurality of features including the extended Haar feature set at a plurality of scales for each of the positive training samples and the negative training samples.

25. The method of claim 2, wherein the plurality of features further comprises a two-directional feature calculated by combining two features of the extended Haar feature set at orthogonal directions.

26. The method of claim 2, wherein the step of extracting a plurality of features for each of the positive training samples and the negative training samples comprises:
rotating the training images to a plurality of angles; and
extracting the plurality of features including the extended Haar feature set for each of the positive training samples and the negative training samples at from the training images at each of the plurality of angles.

27. The method of claim 2, wherein the step of extracting a plurality of features for each of the positive training samples and the negative training samples comprises:
extracting feature values for each of the plurality of features including the extended Haar feature set at a plurality of scales for each of the positive training samples and the negative training samples.

28. The apparatus of claim 10, wherein the plurality of features further comprises a two-directional feature calculated by combining two features of the extended Haar feature set at orthogonal directions.

29. The apparatus of claim 10, wherein the means for extracting a plurality of features for each of the positive training samples and the negative training samples comprises:
means for rotating the training images to a plurality of angles; and
means for extracting the plurality of features including the extended Haar feature set for each of the positive training samples and the negative training samples at from the training images at each of the plurality of angles.

30. The apparatus of claim 10, wherein the means for extracting a plurality of features for each of the positive training samples and the negative training samples comprises:
means for extracting feature values for each of the plurality of features including the extended Haar feature set at a plurality of scales for each of the positive training samples and the negative training samples.

31. The non-transitory computer readable medium of claim 18, wherein the plurality of features further comprises a two-directional feature calculated by combining two features of the extended Haar feature set at orthogonal directions.

32. The non-transitory computer readable medium of claim 18, wherein the computer executable instructions defining the step of extracting a plurality of features for each of the positive training samples and the negative training samples comprise computer executable instructions defining the steps of:
rotating the training images to a plurality of angles; and
extracting the plurality of features including the extended Haar feature set for each of the positive training samples and the negative training samples at from the training images at each of the plurality of angles.

33. The non-transitory computer readable medium of claim 18, wherein the computer executable instructions defining the step of extracting a plurality of features for each of the positive training samples and the negative training samples comprise computer executable instructions defining the step of:
extracting feature values for each of the plurality of features including the extended Haar feature set at a plurality of scales for each of the positive training samples and the negative training samples.

* * * * *